US009106645B1

(12) United States Patent
Vadlamani

(10) Patent No.: US 9,106,645 B1
(45) Date of Patent: Aug. 11, 2015

(54) AUTOMATIC RESET FOR TIME-BASED CREDENTIALS ON A MOBILE DEVICE

(75) Inventor: Ananta Krishna Vadlamani, Sunnyvale, CA (US)

(73) Assignee: Symantec Corporation, Mountain View, CA (US)

( * ) Notice: Subject to any disclaimer, the term of this patent is extended or adjusted under 35 U.S.C. 154(b) by 31 days.

(21) Appl. No.: 13/358,749

(22) Filed: Jan. 26, 2012

Related U.S. Application Data

(60) Provisional application No. 61/436,332, filed on Jan. 26, 2011.

(51) Int. Cl.
| | |
|---|---|
| *G06F 21/72* | (2013.01) |
| *G06F 1/12* | (2006.01) |
| *G06F 1/14* | (2006.01) |
| *H04L 29/06* | (2006.01) |
| *G06F 9/48* | (2006.01) |

(52) U.S. Cl.
CPC .......... *H04L 63/0846* (2013.01); *G06F 21/725* (2013.01); *H04L 63/0838* (2013.01); *G06F 1/12* (2013.01); *G06F 1/14* (2013.01); *G06F 9/4825* (2013.01); *H04L 63/08* (2013.01)

(58) Field of Classification Search
CPC ............. G06F 21/31; G06F 1/14; G06F 1/04; G06F 1/324; G06F 21/725; G06F 1/12; G06F 9/4825; H04L 63/083; H04L 63/08; H04L 63/102; H04L 63/0815; H04L 63/0838; H04L 63/0846
USPC .......................................................... 726/6
See application file for complete search history.

(56) References Cited

U.S. PATENT DOCUMENTS

| | | | | |
|---|---|---|---|---|
| 6,351,821 | B1* | 2/2002 | Voth | 713/600 |
| 6,611,922 | B2* | 8/2003 | Ozcetin et al. | 713/400 |
| 6,662,107 | B2* | 12/2003 | Gronemeyer | 701/478 |
| 6,871,286 | B1* | 3/2005 | Cagle et al. | 726/5 |
| 6,874,037 | B1* | 3/2005 | Abram et al. | 709/248 |
| 6,981,061 | B1* | 12/2005 | Sakakura | 709/248 |
| 7,979,731 | B2* | 7/2011 | Futa et al. | 713/500 |
| 7,984,489 | B2* | 7/2011 | Matsuzaki et al. | 726/6 |
| 8,239,961 | B2* | 8/2012 | Strohwig et al. | 726/26 |
| 8,412,928 | B1* | 4/2013 | Bowness | 713/155 |
| 8,543,829 | B2* | 9/2013 | Von Krogh | 713/185 |
| 8,869,288 | B2* | 10/2014 | Conley et al. | 726/26 |
| 2003/0014678 | A1* | 1/2003 | Ozcetin et al. | 713/400 |
| 2003/0014679 | A1* | 1/2003 | Domon | 713/400 |
| 2003/0208689 | A1* | 11/2003 | Garza | 713/201 |
| 2005/0257072 | A1* | 11/2005 | Cross et al. | 713/193 |
| 2006/0015938 | A1* | 1/2006 | Wlodarczyk | 726/22 |
| 2006/0294593 | A1* | 12/2006 | Eldar et al. | 726/26 |
| 2007/0110109 | A1* | 5/2007 | Jennings et al. | 370/516 |
| 2007/0130474 | A1* | 6/2007 | Shatford | 713/184 |
| 2008/0018496 | A1* | 1/2008 | Tanner et al. | 340/992 |
| 2008/0104409 | A1* | 5/2008 | Matsuoka et al. | 713/178 |
| 2008/0168543 | A1* | 7/2008 | von Krogh | 726/6 |

(Continued)

*Primary Examiner* — Eleni Shiferaw
*Assistant Examiner* — Nelson Giddins
(74) *Attorney, Agent, or Firm* — Lowenstein Sandler LLP

(57) ABSTRACT

Embodiments of the present disclosure may provide methods and devices capable of synchronizing time between a credential device and an authentication service. In an embodiment, a change in a time value on a device may be detected. A time value may be retrieved from an authentication service, and a new time value generated based upon at least the time value retrieved from the authentication service. The new time value may be used to set a time value at the device, and/or to generate a time-based credential.

13 Claims, 3 Drawing Sheets

(56) References Cited

U.S. PATENT DOCUMENTS

| | | | |
|---|---|---|---|
| 2008/0168544 A1* | 7/2008 | von Krogh | 726/6 |
| 2009/0083444 A1* | 3/2009 | Faist | 709/248 |
| 2009/0316903 A1* | 12/2009 | Jeung | 380/271 |
| 2010/0095249 A1* | 4/2010 | Yoshikawa et al. | 715/856 |
| 2010/0202436 A1* | 8/2010 | Albert et al. | 370/350 |
| 2011/0145364 A1* | 6/2011 | Joyce et al. | 709/219 |
| 2011/0197266 A1* | 8/2011 | Chu et al. | 726/5 |
| 2011/0228888 A1* | 9/2011 | Gelter et al. | 375/371 |
| 2012/0023559 A1* | 1/2012 | Dietrich et al. | 726/6 |
| 2012/0210408 A1* | 8/2012 | Lu et al. | 726/6 |
| 2013/0014237 A1* | 1/2013 | Krogh | 726/6 |
| 2014/0095887 A1* | 4/2014 | Nayshtut et al. | 713/189 |

* cited by examiner

AUTOMATIC RESET FOR TIME-BASED CREDENTIALS ON A MOBILE DEVICE

CROSS REFERENCE TO RELATED APPLICATION

The present application claims the benefit of Provisional Application Ser. No. 61/436,332, having a filing date of Jan. 26, 2011.

BACKGROUND

A common step in deciding whether to grant a request for access to data or services in a network is to authenticate the requesting user. Authentication is the process of establishing or confirming one or more characteristics associated with a user or a request. For example, authentication may include confirming a user's identify or confirming that a request is generated by a particular device. In computer networks, authentication commonly involves the use of passwords. A password may be considered a first authentication factor because it is something the user knows that presumptively no one else knows.

Because passwords may be vulnerable to various exploits, security may be improved by adding a second authentication factor. Second authentication factors generally include something the user has (as opposed to something the user knows). Second authentication factors preferably include credentials that can be generated systematically and verified efficiently. Sources of second authentication factors can include smart cards, tokens, and other similar security devices that may be referred to generally as security tokens.

Some security tokens and other forms of authentication make use of One-Time Passwords (OTPs). An OTP can be a number or alphanumeric string that is generated once and is not reused. For example, a token can generate an OTP that is sent to an authentication service. The authentication service generates an OTP using its copy of the secret. The user is authenticated if the OTP determined by the authentication service matches the OTP provided by the user.

OTP credentials may be based on several mechanisms to vary the generated OTP. For example, event-based OTP tokens may generate a new OTP every time an event, such as a button press or other user action, occurs at the token. As another example, time-based OTP systems may generate a new OTP after the passage of a set amount of time.

Time-based one-time-password (OTP) credentials typically depend on synchronization of a clock on a device, such as an authentication token, with a clock at a authentication service where credentials generated by the device are to be validated.

These one-time-password credentials may be software-based so that they can execute on a computing device such as a desktop, laptop or a mobile phone. One potential challenge of OTP credentials, in some cases especially software time-based one-time-password credential systems, is that the clocks at the device and at the authentication service can become unsynchronized. This may occur, for example, when the time on the device is changed manually, when the device moves to a different time zone, or due to time drift within the device and/or the authentication service. When the clocks become unsynchronized, a credential generated by the device may stop working with little indication to the user that the cause of the non-working credential is that the device has generated an incorrect one-time password.

BRIEF SUMMARY

Embodiments of the present disclosure may provide methods and devices capable of synchronizing time between a credential device and an authentication service. In an embodiment, a change in a time value on a device may be detected. A time value may be retrieved from an authentication service, and a new time value generated based upon at least the time value retrieved from the authentication service. The new time value may be used to set a time value at the device, and/or to generate a time-based credential.

Additional features, advantages, and embodiments of the disclosed subject matter may be set forth or apparent from consideration of the following detailed description, drawings, and claims. Moreover, it is to be understood that both the foregoing summary and the following detailed description are exemplary and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

Figure 1:
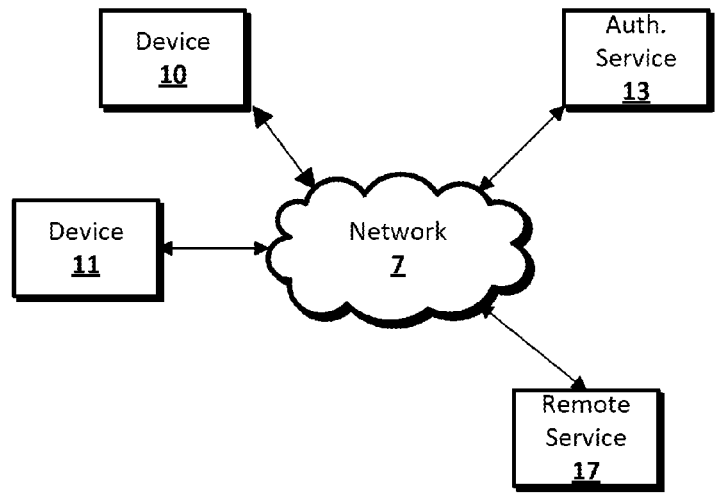
FIG. 1 shows an example network arrangement according to an embodiment of the disclosure.

Various techniques may be used to maintain time synchronization between an authentication device and the authentication service. For example, a software time-based one-time-password credential could synchronize or reset the credential on a periodic basis, such as every hour, every day, or the like. As another example, the user could reset the credential on the device, such as by clicking a reset button or other user interface element. The reset could be performed whenever a password is desired, upon notification of a credential failure, or the like. However, in some situations and configurations, such techniques may have undesirable side effects. For example, where the authentication device is a mobile device such as a smartphone, tablet, or the like, additional clock synchronizations may incur unnecessary communication overhead between the device and the authentication service.

In an embodiment of the disclosed subject matter, system capabilities of a device where the credential resides, such as a mobile phone, desktop/laptop, or other device, may be leveraged to perform automatic clock synchronization, and/or reset a time-based one-time-password credential.

In an embodiment, such a technique includes a process of trapping events thrown by the platform when time changes occur, and making sure that any adjustments to the device time are captured through callbacks to registered event handlers. Such adjustments may include manual and/or automatic changes. When a time change is detected, an event handler may call the authentication service to fetch the current time on the server. The new time difference between the server time and the device time is noted so that the difference can be accounted for during the generation of a subsequent OTP.

The time difference may be accounted for in various ways. For example, a time value obtained from an authentication service or other source may be used to generate a new time value, reset the device clock, or perform other actions. In an embodiment, the device clock or another time value on the device may be set or reset to match a time value obtained from the authentication service or other authoritative time source. In an embodiment, a new time value based on the device time value, the obtained time value, a difference between the two, or the like may be generated. The new time value may be used to generate time-based OTPs, to reset a time value on the device, or the like.

In an embodiment, this technique may not require the software-based credential application process to be running on the client device on a continuous basis to be able to process these time-change notifications. This is advantageous because a continuously-running application could drain the battery on the client device or otherwise require resources that a user would rather devote to other activities.

Some devices may be able to adjust time on a frequent basis by synchronizing with the network time. As previously described, such regular synchronization may generate a relatively large number of time-changing events to be processed, which could in turn result in an undesirably large number of requests being made to the authentication server. In an embodiment, such frequent synchronizations may not be necessary, because time-based OTP credential algorithms may allow for a degree or number of acceptable time-drifts between the authentication server and the client device. For example, a time-based OTP algorithm may only generate a new OTP after a certain amount of time has passed; OTPs generated within that time period may be the same. In an embodiment, this also may be accounted for by accumulating time changes over a number of such events, and doing an actual synchronization by fetching time from the authentication server only when the time adjustment has crossed a threshold of acceptable time-drift for the software time-based one-time-password credential. As a specific, illustrative example, an OTP device may generate a new OTP once every 30 seconds. In this case, the device may be configured to re-synchronize time with the authentication service only when the time difference exceeds some fraction of 30 seconds, such as 10, 15, 20, 30 seconds, or any other suitable time period. The device may be configured to synchronize time when the difference reaches or exceeds 30 seconds, to prevent the device from generating an incorrect OTP.

In an embodiment, the techniques described herein may be performed without user awareness or manual intervention. Thus, from a user's point of view, a software time-based one-time-password credential may function continuously in spite of any time changes. For example, a user may not encounter a situation where a credential fails due to time changes on the particular device. In contrast to other techniques, synchronization may be performed only when necessary. Thus, unnecessary network traffic and other resource usage also may be minimized or lower than other techniques.

FIG. 1 shows an example network arrangement according to an embodiment. One or more devices 10, 11, such as local computers, smart phones, tablet computing devices, and the like may connect to other devices via one or more networks 7. The network may be a local network, wide-area network, the Internet, or any other suitable communication network or networks, and may be implemented on any suitable platform including wired and/or wireless networks. The clients may communicate with one or more services 13, 17, such as protected services, websites, remotely-hosted applications, and the like. The devices may be directly accessible by the clients 10, 11, or one or more other devices may provide intermediary access such as where a server or intermediary service provides access to other resources. The clients 10, 11 also may access remote platforms or services provided by remote platforms such as cloud computing arrangements and services. As previously described, an authentication service 13 may authenticate users via credentials, such as OTPs, provided by the user's device 10 or 11 to the authentication service. For example, the authentication service 13 may control user access to a remote service 17 by way of an OTP or other time-based credential.

Figure 2:
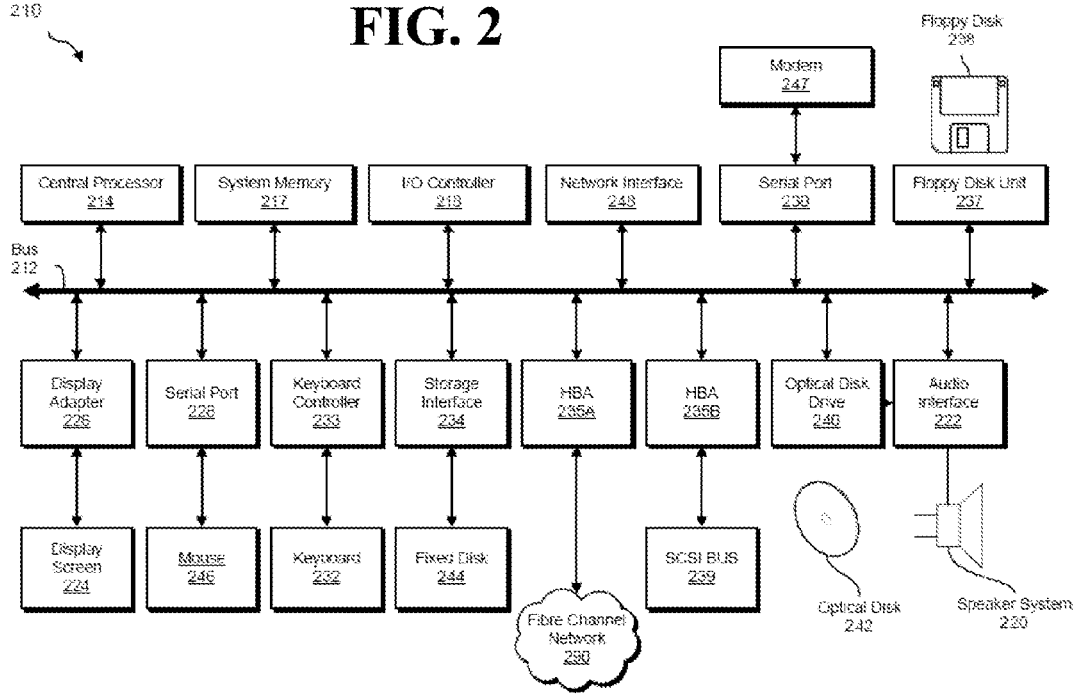
FIG. 2 depicts a block diagram of a computer system according to an embodiment of the disclosure.

FIG. 2 depicts a block diagram of a computer system 210 suitable for implementing the present disclosure. Computer system 210 includes a bus 212 which interconnects major subsystems of computer system 210, such as a central processor 214, a system memory 217 (typically RAM, but which may also include ROM, flash RAM, or the like), an input/output controller 218, an external audio device, such as a speaker system 220 via an audio output interface 222, an external device, such as a display screen 224 via display adapter 226, serial ports 228 and 230, a keyboard 232 (interfaced with a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included are a mouse 246 (or other point-and-click device, coupled to bus 212 via serial port 228), a modem 247 (coupled to bus 212 via serial port 230), and a network interface 248 (coupled directly to bus 212).

Bus 212 allows data communication between central processor 214 and system memory 217, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components. Applications resident with computer system 210 are generally stored on and accessed via a computer readable medium, such as a hard disk drive (e.g., fixed disk 244), an optical drive (e.g., optical drive 240), a floppy disk unit 237, or other storage medium. Additionally, applications can be in the form of electronic signals modulated in accordance with the application and data communication technology when accessed via network modem 247 or interface 248.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. The operation of a computer system such as that shown in FIG. 2 is readily known in the art and is not discussed in detail in this application. Code to implement the present disclosure can be stored in computer-readable storage media such as one or more of system memory 217, fixed disk 244, optical disk 242, or floppy disk 238. The operating system provided on computer system 210 may be MS-DOS®, MS-WINDOWS®, OS/2®, UNIX®, Linux®, or another known operating system.

Moreover, regarding the data transmission and related signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Figure 3:
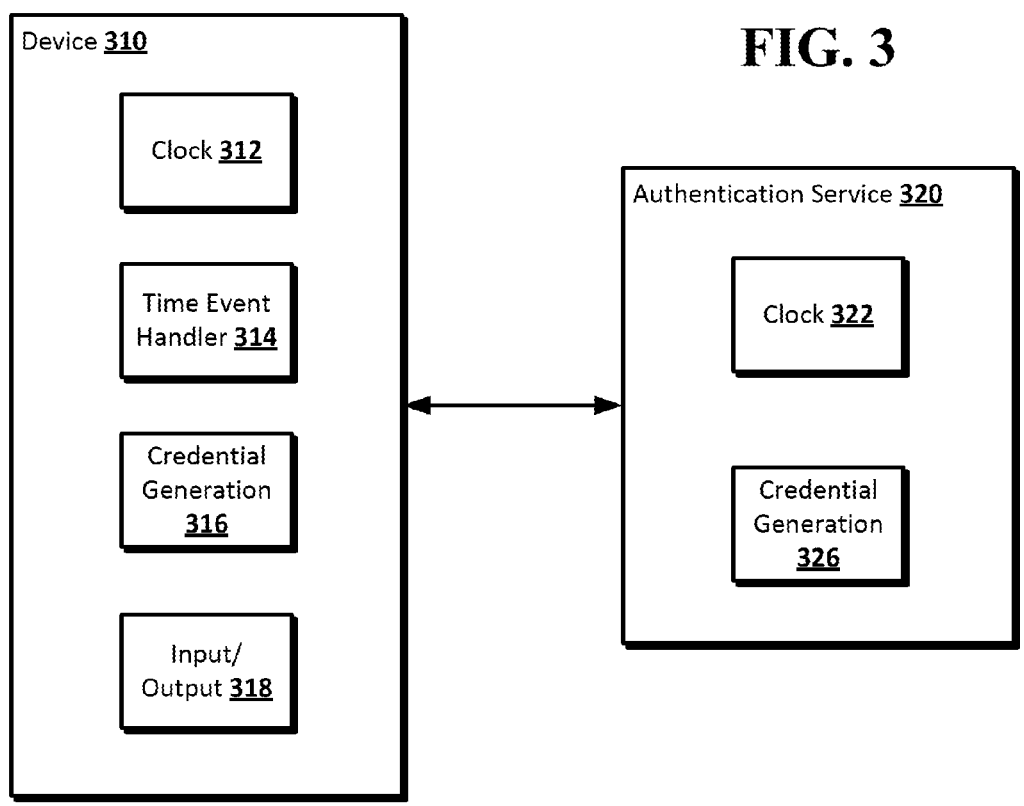
FIG. 3 shows an example credential device and an example system including the credential device and an authentication service according to an embodiment.

FIG. 3 shows an example credential device and an example system including the credential device and an authentication service according to an embodiment. The credential device 310 may be any device configured to, or capable of generating OTPs or other time-based credentials. The device 310 may include a clock 312 or other time value. An associated event handler 314 may be called, and/or may provide notification to other modules within the device 310, when the time value of the clock 312 changes. As previously described, a change in the time value 312 may be used to trigger generation of a new credential, synchronization of the clock 312 with a time value from the authentication service 320, or the like. A credential generation module 316 may operate to generate time-based OTPs or other credentials as previously described, such as upon a change in a time value 312, responsive to a determination that a time value 312 does not match a time value obtained from the authentication service 320, or the like. An input/output (communication) component 318 may allow the device 310 to communicate with other entities as previously described, such as the authentication service 320. The device 310 also may include other modules, processors, functionality, and the like. For example, the device 310 may include one or more general- or specialty-purpose processors, such as to manage communications between the components 312, 314, 316, 318; to generate OTPs or other credentials at the direction of, or in conjunction with, the credential generation module 316; or to perform other functions of the device 310.

In an embodiment, an authentication service 320 may include a time value such as a clock 322, a credential generation module 316, and other components corresponding to those described with respect to the device 310. The credential generation module 326 may generate credentials such as OTPs, which may be compared to credentials generated by the device 310 to authenticate a user. The service 320 also may include other servers, modules, processors, functionality, and the like. For example, the service 320 may include one or more general- or specialty-purpose processors, such as to manage communications between the components 322, 326; to generate OTPs or other credentials at the direction of, or in conjunction with, the credential generation module 326; or to perform other functions of the service 320.

Figure 4:
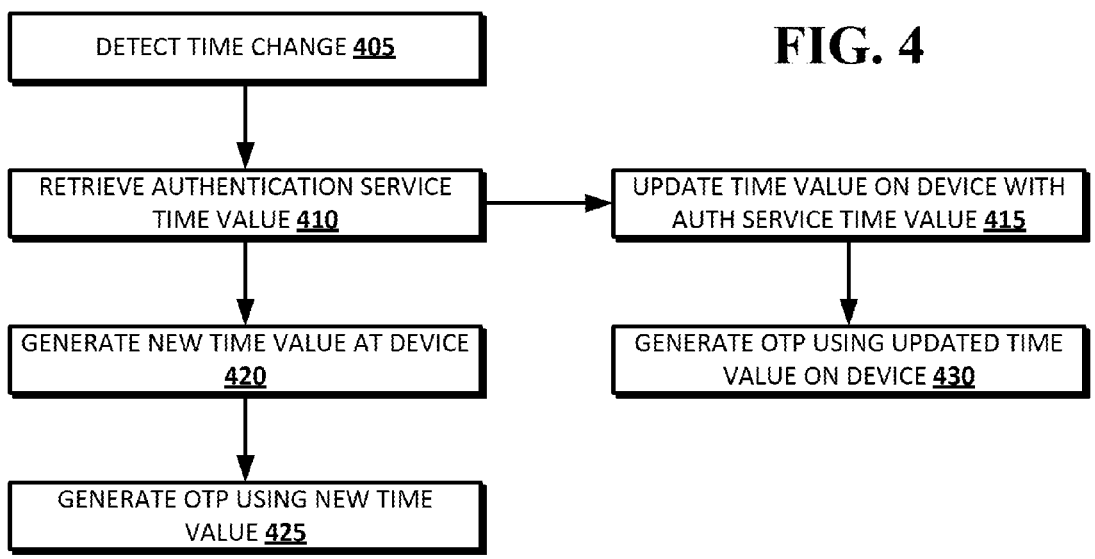
FIG. 4 shows an example process for resetting a credential generating token according to an embodiment.

FIG. 4 shows an example process for resetting a credential generating token according to an embodiment. At 405, the device may detect a time change, such as a change to a clock or other time value, within the device as previously described. A time value may be retrieved from an authentication service associated with the device, or another suitable clock or time value source. The device may perform various functions with the obtained value. For example, at 415 a time value on the device, such as the device's clock, may be updated to match the time value obtained from the authentication service. Thus, the device clock may be synchronized to the authentication service clock, after which OTPs or other credentials may be generated at 430, without risking that the credential will be invalid due to a mismatch in time value between the device and the authentication service. In an embodiment, at 420 a new time value may be generated based upon the time value obtained from the authentication service, the device's internal time value, or a combination thereof. For example, a time value may be generated that describes the difference between the authentication service time value and the device's time value. The new value may be used, for example, to reset the time value on the device, to generate new time-based credentials, or to generate other values within the device.

Various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, wherein, when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The particular application of synchronizing time for the purposes of generating one-time passwords is provided as an illustrative example. It will be understood that the same techniques may be used to generate any time-based credential, and need not be tied to or utilize any particular OTP or other credential generation algorithm. In some embodiments, the techniques described herein may be extended for other applications that have a need to synchronize time between a central server or other resource and the local device.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

The invention claimed is:

1. A method of synchronizing time between a device and an authentication service, the method comprising:
   detecting, by an event handler executing on a processor on the device, a change in a time value on the device on a periodic basis and the periodic basis is set to reduce a battery drain of the device, wherein:
   the detecting comprises capturing an adjustment to the time value on the device through a callback to the event handler when the change in the time value occurs;
   accumulating a plurality of time changes to the time value on the device;
   determining a total time difference based on the plurality of time changes to the time value on the device;
   determining that the total time difference exceeds a credential mismatch time value; and
   retrieving, by the processor, a time value from an authentication service when the total time difference in the time value on the device exceeds the credential mismatch time value;
   generating, by the processor, a new time value based on at least the time value retrieved from the authentication service; and
   generating, by a software-based credential application executing by the processor, a time-based credential based on the new time value.

2. A method as recited in claim 1, wherein the new time value is based on the time value on the device, and a difference between the time value on the device and the time value retrieved from the authentication service.

3. A method as recited in claim 1, further comprising setting the time value of the device based on the new time value.

4. A method as recited in claim 1, wherein the new time value is equal to the time value retrieved from the authentication service, the method further comprising setting the time value of the device to be equal to the new time value.

5. A method as recited in claim 1, wherein the change in the time value on the device is detected based on a call to a registered event handler associated with the time value on the device.

6. A method as recited in claim 1, wherein the time-based credential is a time-based one-time password.

7. A device comprising:
   memory to store a clock storing a time value, an event handler, a communication module and a credential generator; and
   a processor coupled to the memory, wherein the processor is configured to execute the event handler, the communication module and the credential generator, wherein:
   the event handler is to detect a change in the time value on a periodic basis and the periodic basis is set to reduce a battery drain of the device, wherein:
   the event handler is to capture an adjustment to the time value on the device through a callback to the event handler when the change in the time value occurs;
   accumulate a plurality of time changes to the time value on the device;
   determine a total time difference based on the plurality of time changes to the time value on the device;
   determine that the total time difference exceeds a credential mismatch time value; and
   the communication module is to retrieve a time value from an authentication service when the total time difference in the time value on the device exceeds the credential mismatch time value;
   the processor is configured to generate a new time value based on at least the time value retrieved from the authentication service; and
   the credential generator is to generate a time-based credential based on the new time value.

8. A device as recited in claim 7, wherein the new time value is based on the time value on the device, and a difference between the time value on the device and the time value retrieved from the authentication service.

9. A device as recited in claim 7, the processor is configured to set the clock with the time value of the device based on the new time value.

10. A device as recited in claim 7, wherein the new time value is equal to the time value retrieved from the authentication service, the processor is configured to set the time value of the device to be equal to the new time value.

11. A device as recited in claim 7, wherein the change in the time value on the device is detected based on a call to the event handler.

12. A device as recited in claim 7, wherein the time-based credential is a time-based, one-time password.

13. A non-transitory computer-readable medium storing a plurality of instructions which when executed cause a processor to perform operations comprising:
   detect, by an event handler executing on a processor on the device, a change in a time value on the device on a periodic basis and the periodic basis is set to reduce a battery drain of the device, wherein:
   the event handler is to capture an adjustment to the time value on the device through a callback to the event handler when the change in the time value occurs;
   accumulate a plurality of time changes to the time value on the device;
   determine a total time difference based on the plurality of time changes to the time value on the device;
   determine that the total time difference exceeds a credential mismatch time value; and
   retrieve, by the processor, a time value from an authentication service when the total time difference in the time value on the device exceeds the credential mismatch time value;
   generate, by the processor, a new time value based on at least the time value retrieved from the authentication service; and
   generate, by a software-based credential application executing by the processor, a time-based credential based on the new time value.

* * * * *